United States Patent [19]

Aimar

[11] 4,021,888
[45] May 10, 1977

[54] PLASTIC CLAMP
[75] Inventor: Michele Aimar, Turin, Italy
[73] Assignee: ITW Fastex Italia, S.p.A., Turin, Italy
[22] Filed: Apr. 8, 1976
[21] Appl. No.: 674,794
[30] Foreign Application Priority Data
  Apr. 29, 1975  Italy .................. 22830/75
[52] U.S. Cl. .................. 24/16 PB; 24/206 B
[51] Int. Cl.² .................. B65D 63/00
[58] Field of Search ......... 24/206 A, 206 B, 16 PB, 24/30.5 R, 30.5 P, 73 PB, 17 AP, 230 F, 230 B, 230 CF, 16 R; 248/68 R, 73, 74 R, 74 PB

[56] References Cited
  UNITED STATES PATENTS

| | | | |
|---|---|---|---|
| 1,627,776 | 5/1927 | Haumerson | 24/206 B |
| 3,735,449 | 5/1973 | Rosales | 24/16 PB |
| 3,872,547 | 3/1975 | Caveney et al. | 24/16 PB |
| 3,906,593 | 9/1975 | Caveney et al. | 24/16 PB |
| 3,952,373 | 4/1976 | Noovily | 24/16 PB |

*Primary Examiner*—G. V. Larkin
*Attorney, Agent, or Firm*—Jack R. Halvorsen; Robert W. Beart

[57] ABSTRACT

A plastic clamp is provided for tightening a bundle of thread-like elements. This clamp is of the type comprising a head having a passage therein and an integral strap provided with ratchet teeth which, as the strap is passed around the bundle and threaded into said passage, engages a pawl formed in the passage integrally with the head. The pawl is connected to the head through a pair of coaxially extending pins formed on two opposite sides of said pawl.

2 Claims, 7 Drawing Figures

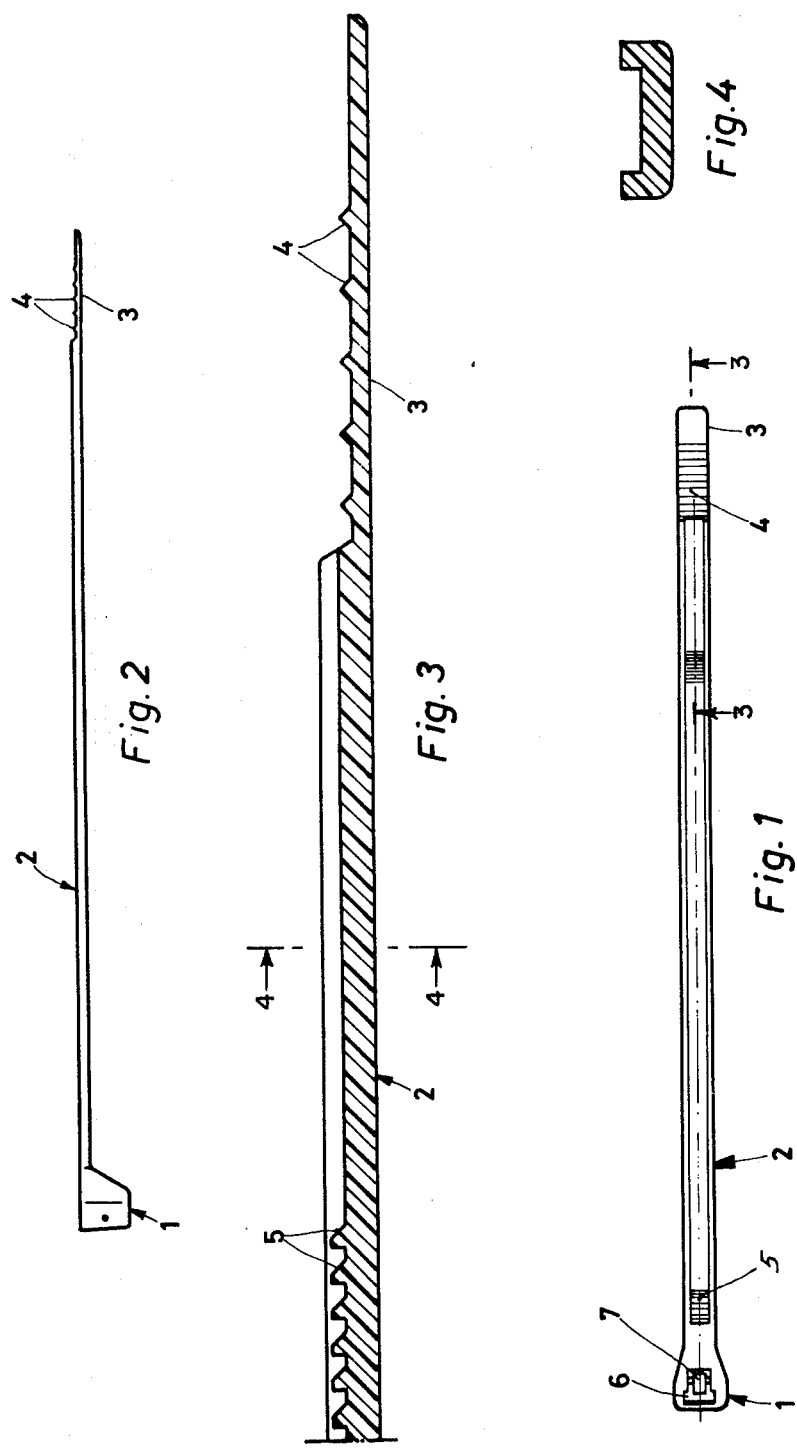

PLASTIC CLAMP

This invention relates to clamp devices for tightening a bundle of elongated elements, such as electrical leads, cables, pipes, threads and the like.

Plastic clamps of this kind are already known and generally comprise a head portion having a passage therein and an integral strap provided with ratchet teeth which, as the strap is wound around the bundle of elongated elements and threaded in the head passage for tightening said elements, engages a pawl formed in the head passage integrally with the head portion so as to lock together the elements of the bundle. However, these clamp devices of prior art have the disadvantage that they are incapable of assuring a safe locking action under all the forces exerted on the toothed portion of the clamp, particularly in the case that the pawl is broken away from the head portion as a result of an excessive and extended force exerted thereon.

The object of this invention is to obviate this disadvantage.

More particularly, the plastic clamp according to this invention and of the type comprising a head portion having a passage therein and an integral strap provided with ratchet teeth which, as it is passed around the bundle of the elongated elements and threaded in the passage for tightening said elements, engages a pawl formed in the passage integrally with the head, is characterized in that the pawl is connected to the head portion through a pair of coaxially extending pivot pins formed on two opposite sides of the pawl.

As a result of this arrangement and by suitably choosing the location of the pin axes the lever arm defined by the contact point of the pawl with the ratchet teeth and the axis of the pawl pins is so small as to reduce to a minimum the shearing torque applied on the pawl pins. In this manner there is no danger of pawl pins breaking away as a result of an excessive force applied on the pawl.

According to a feature of the invention, the pawl on the side opposite to that of engagement with the strap ratchet teeth is provided with a profiled surface adapted to engage a mating profiled surface partially defining the passageway in the head portion.

Through the engagement between these profiled surfaces the pawl, once it is in a locked position, is firmly held between the ratchet teeth and the profiled surface of the head passage, even in the case that the pivot pins thereof should be broken away and the pawl would remain detached from the head portion.

These and other features of the invention will be readily apparent from the following detailed description, given by way of example only and therefore not intended in a limiting sense, of an embodiment thereof, taken in connection to the accompanying drawing, wherein:

FIG. 1 is a plan view of a clamp according to this invention;

FIG. 2 is an elevation view of the clamp in FIG. 1;

FIG. 3 is a fragmentary sectional view of an end of the clamp in an enlarged scale taken along the line 3—3 of FIG. 1;

FIG. 4 is a sectional view taken along the line 4—4 of FIG. 3;

Figure 5:
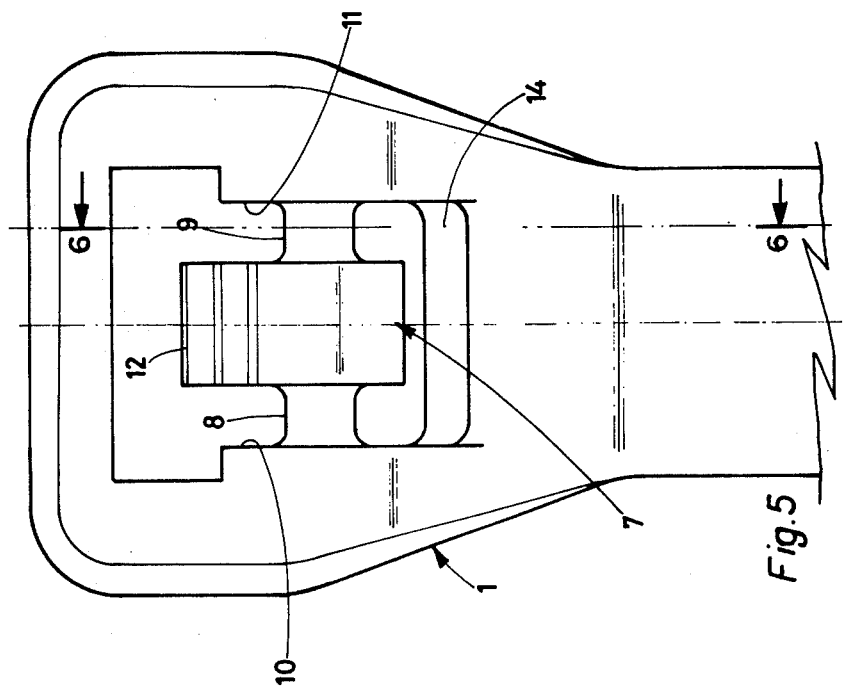
FIG. 5 is a fragmentary plan view in a further enlarged scale of the clamp head portion.

Referring first to FIGS. 1 to 4, there is shown that the clamp comprises an enlarged head portion 1 from which a thin strap 2 extends which has for the most part of its extension an U-shaped cross-section and terminates with a thinner end 3 provided with transverse grip ridges 4.

In the portion having the U-shaped cross-section the strap is provided with ratchet teeth 5 terminating a short distance from the end 3 having the ridges 4.

Figure 6:
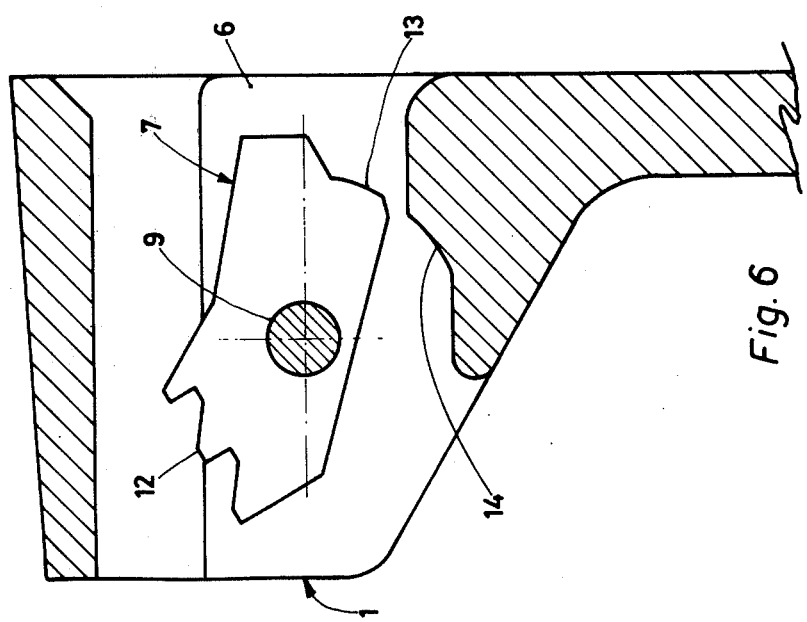
FIG. 6 is a sectional view taken along the line 6—6 of FIG. 5.

As may be seen in FIGS. 5 and 6, in the head portion 1 a passage 6 is provided, in which a pawl 7 is arranged, said pawl 7 being integrally connected to the head by means of a pair of coaxial pivot pins 8, 9 integrally formed with the opposite walls 10 and 11 respectively, defining the passage 6. The pawl 7 is provided at one end with ratchet teeth 12 and at the other end with a profiled surface 13. The passage 6, on the side of the profiled surface 13 is provided with a profiled surface 14, mating the profiled surface 13.

When a bundle of elongated elements, e.g. electrical cables, is to be tightened together, the strap is wound around the bundle, the strap end 3 is inserted into the passage 6 of the head portion 1 and this end 3 is pulled until the bundle is tightened the desired amount. Due to the shape of ratchet teeth 5 of the strap, when the latter is pulled in the direction of the arrow of FIG. 7, these teeth pass over the pawl 7 without firmly engaging it. As the tightening amount of the bundle wound by the strap is reached, the strap end 3 is released and the strap tends to move back by reaction in the direction opposite that of the arrow thereby engaging the teeth 12 of the pawl 7 and locking it in the position shown in FIG. 7, where the profiled surface 13 of the pawl engages the mating profiled surface 14 of the passage 6 in the head portion 1.

Figure 7:
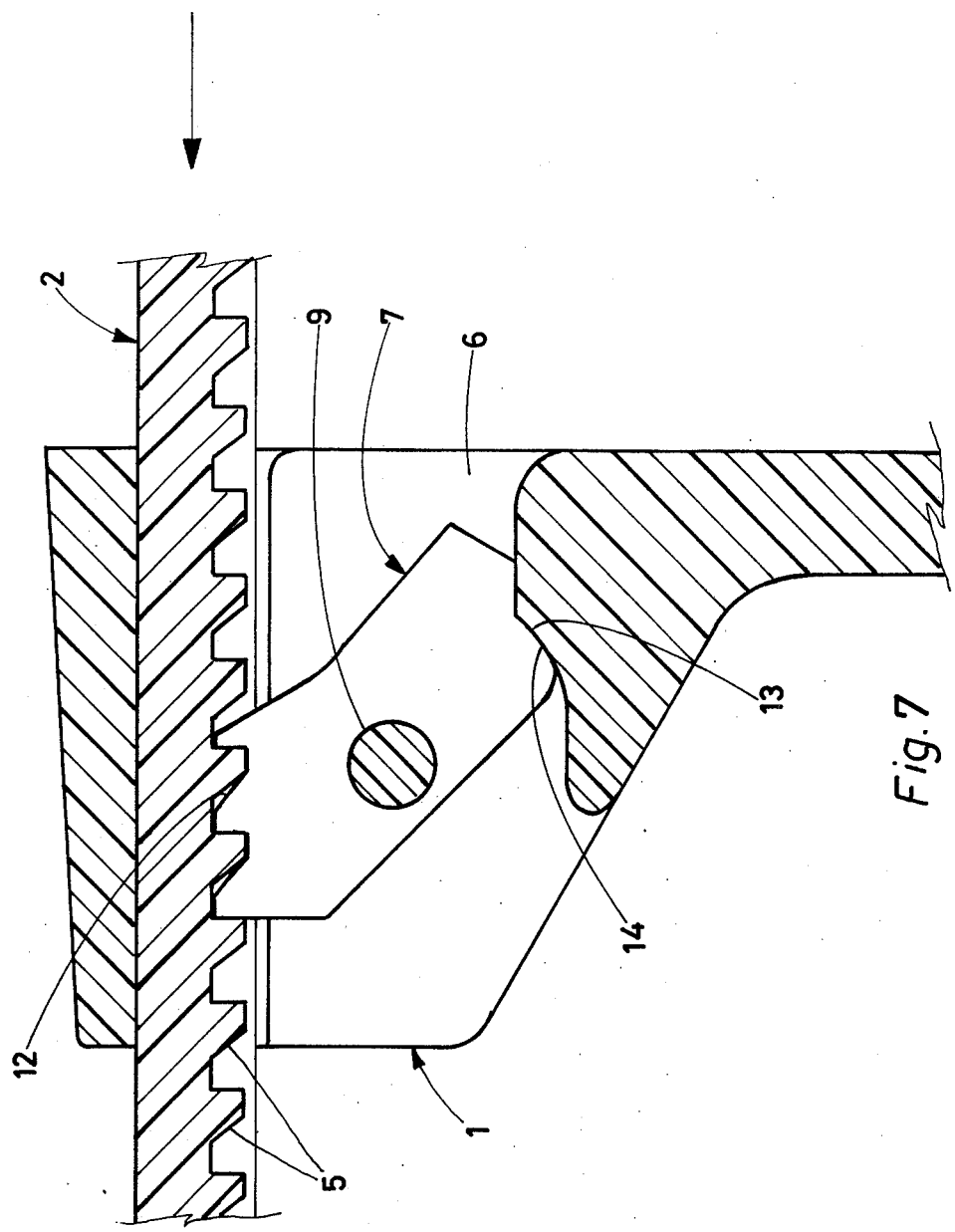
FIG. 7 is a fragmentary sectional view of the clamp head portion similar to FIG. 6 but with the strap end having the ratchet teeth inserted therein and the pawl in a locked position.

From an examination of FIG. 7 it is seen that any attempt to unthread the strap 2 from the head portion 1 would cause the pawl 7 to be further locked between the ratchet teeth 5 of the strap and the profiled surface 14 of the wall of passage 6 thereby causing the fastening to become more and more firm. Even in the case that both the pivot pins 8 and 9 should be broken under the shearing force exerted thereon, the pawl 7 would remain firmly engaged between the ratchet teeth 5 and the profiled surface 14.

While a single embodiment of the invention has been illustrated and described, it is obvious that various changes and modifications can be made thereto without departing from the scope of the invention.

What I claim is:

1. A one-piece plastic clamp for tightening a bundle of elongated elements comprising a head portion having a passage therein and an integral strap provided with ratchet teeth, a pawl formed in said passage integrally with said head portion, characterized in that said pawl includes means connected to the head body, said means including a pair of coaxially extending torsion pins formed on two opposite sides of said pawl, said pawl including complementary ratchet teeth for engagement with the strap when it is passed around the bundle of elongated elements and threaded into the passage for tightening said elements.

2. A plastic clamp according to claim 1, characterized in that said pawl on the side opposite that of engagement with said ratchet teeth of said strap is provided with a profiled surface, a mating profiled surface partially defining said passage in the head portion, said pawl being torsionally rotatable about said pins as said strap is threaded past said pawl, reversal of the direction of movement of said strap causing positive engagement of said pawl teeth with said strap teeth and engagement of said profiled surfaces with one another thereby limiting reverse movement of said pawl about the axis of said pins.

* * * * *